United States Patent [19]

Matayabas, Jr. et al.

[11] Patent Number: 5,502,137

[45] Date of Patent: Mar. 26, 1996

[54] POLYETHER GLYCOLS AND ALCOHOLS DERIVED FROM 3,4-EPOXY-1-BUTENE, TETRAHYDROFURAN AND AN INITIATOR

[75] Inventors: James C. Matayabas, Jr.; Peter B. MacKenzie; John A. Hyatt, all of Kingsport, Tenn.

[73] Assignee: Eastman Chemical Company, Kingsport, Tenn.

[21] Appl. No.: 344,905

[22] Filed: Nov. 25, 1994

[51] Int. Cl.$^6$ .............................. C08G 65/14; C08G 65/08
[52] U.S. Cl. ............................................ 528/393; 528/417
[58] Field of Search ...................... 528/421, 393, 528/417; 526/273, 332

[56] References Cited

U.S. PATENT DOCUMENTS

| | | | |
|---|---|---|---|
| 3,133,905 | 5/1964 | Snyder et al. | 528/393 |
| 4,500,705 | 2/1985 | Copelin | 528/417 |

OTHER PUBLICATIONS

Bartlett, *J. Am. Chem. Soc.*, 70, 926 (1948).
Ivanchev, *J. Polym. Sci., Polym. Chem. Ed.*, 18, 2051–2059 (1980).
Kubisa, *Makromol. Chem., Macromol Symp.*, 13/14, 203 (1988).
Brzezinska, *Makromol. Chem., Rapid Commun.*, 7, 1 (1986).
Bednarek, *Makromol. Chem.*, Suppl., 15, 49 (1989).
Biedron, *Makromol. Chem., Macromol Symp.*, 32, 155 (1990).

Primary Examiner—Joseph L. Schofer
Assistant Examiner—Wu C. Cheng
Attorney, Agent, or Firm—J. Frederick Thomsen; Harry J. Gwinnell

[57] ABSTRACT

Disclosed are novel polyether compounds obtained by the reaction or polymerization of 3,4-epoxy-1-butene in the presence of tetrahydrofuran, an acidic catalyst and a nucleophilic initiator compound. The polyether compounds comprise m units of residue (1), n units of residue (2), and p units of residue (3) wherein (i) residues (1), (2) and (3) have the structures:

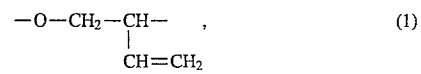

(1)

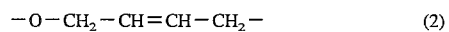

(2)

and

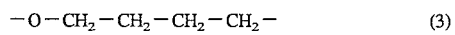 (3)

(ii) the total value of m+n+p is 5 to 70; (iii) the value of n/(m+n+p) is in the range of 0.2 to 0.4, i.e., residue (2) constitutes from 20 to 40 mole percent of the total moles of residues (1), (2) and (3); and (iv) at least 98 percent of the terminal groups have the structure:

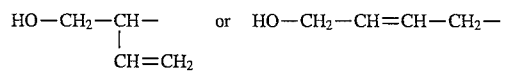

5 Claims, No Drawings

POLYETHER GLYCOLS AND ALCOHOLS DERIVED FROM 3,4-EPOXY-1-BUTENE, TETRAHYDROFURAN AND AN INITIATOR

This invention pertains to certain novel polyether compounds. More specifically, this invention pertains to polyether glycols and alcohols containing repeating units of the structure:

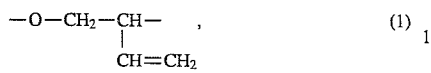

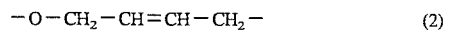

and

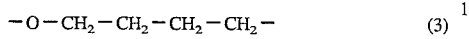

This invention also pertains to a process for the preparation of the polyether compounds by the polymerization of 3,4-epoxy-1-butene in the presence of certain strong acidic catalysts, tetrahydrofuran, and a hydroxyl initiator compound.

U.S. Pat. No. 3,133,905 discloses the copolymerization of small amounts of 3,4-epoxy-1-butene with tetrahydrofuran using as catalyst boron trifluoride to give a copolymer comprising about 90 mole percent residues of tetrahydrofuran and only 10 mole percent residues of 3,4-epoxy-1-butene. However, only about two-thirds of the available 3,4-epoxy-1-butene is incorporated into the copolyether, and the repeat-unit structure is not disclosed. S. S. Ivanchev, et al., *J. Polym. Sci.*, Polym. Chem. Ed., 18, 2051–2059 (1980), investigated the homopolymerization of 3,4-epoxy-1-butene with boron trifluoride etherate and disclose that the rate of termination is much faster than the rate of propagation, leaving much of the 3,4-epoxy-1-butene unreacted. Our investigation of this chemistry corroborates this result, i.e., low yields of a thermally-unstable, white material are obtained and the chloroform-soluble portion of the material contains only residue (1).

The disclosure of U.S. Pat. No. 3,133,905 differs from the present invention in a number of ways. For example, the polyethers of the present invention are prepared using a nucleophilic compound as an initiator for the copolymerization of 3,4-epoxy-1-butene and therefore contain residues derived from the nucleophilic initiator. Another difference is that the novel unsaturated polyether compounds of this invention comprise repeat units of residue (2) in addition to residues (1) and (3). The novel unsaturated polyether compounds of this invention comprise minor amounts of residue (3) derived from tetrahydrofuran compared to the amount of residues (1) and (2) derived from 3,4-epoxy-1-butene. Boron trifluoride, which was employed in the preparation of the polyethers of U.S. Pat. No. 3,133,905 does not give residues (2) and suffers from deactivation during the polymerization of 3,4-epoxy-1-butene.

Other references which pertain to the general state of the 3,4-epoxy-1-butene art are discusses below. P. D. Bartlett et al., *J. Am. Chem. Soc.*, 70, 926 (1948), disclose the sulfuric acid-catalyzed methanolysis of 3,4-epoxy-1-butene to give 1-hydroxy-2-methoxy-3-butene. A. M. Ross, et al., *J. Am. Chem. Soc.*, 104, 1658 (1982), disclose the acid-catalyzed hydrolysis of 3,4-epoxy-1-butene to produce a mixture of 3,4-dihydroxy-1-butene and 1,4-dihydroxy-2-butene in a 96/4 ratio. Polymers comprising residues (1) and (2) are not contemplated by the above-cited prior art, and the reactions exemplified employ an excess of the nucleophile.

U.S. Pat. No. 2,680,109 discloses the polymerization of unsaturated 1,2-epoxides, including 3,4-epoxy-1-butene, in the presence of stannic chloride and a small amount of water. British Patent 869,112 and U.S. Pat. Nos. 3,031,439 and 3,417,064 disclose the copolymerization of 3,4-epoxy-1-butene with ethylene oxide and propylene oxide, using as catalyst strontium carbonate containing a small amount of water.

U.S. Pat. Nos. 3,158,705, 3,158,581, and 3,158,591 disclose the polymerization of 3,4-epoxy-1-butene to give polyethers consisting only of residue (1), using as catalyst trialkylaluminum compounds prereacted with water. These patents also disclose the copolymerization of 3,4-epoxy-1-butene with ethylene oxide, propylene oxide, and epichlorohydrin, using as catalyst trialkylaluminum compounds prereacted with water. U.S. Pat. No. 3,509,118 discloses the preparation of unsaturated polyether glycols containing only residue (1) prepared by n-butyl lithium cleavage of the high molecular weight polyethers prepared by the polymerization of 3,4-epoxy-1-butene in benzene using triethylaluminum prereacted with water.

U.S. Pat. No. 3,133,905 also discloses the copolymerization of a small amount of 3,4-epoxy-1-butene with ethylene oxide using ethylene glycol as the initiator and solid sodium hydroxide as the catalyst in a pressurized resin pot. U.S. Pat. No. 3,468,847 discloses the copolymerization of 3,4-epoxy-1-butene, hexafluoroacetone, ethylene oxide, and propylene oxide, using cesium fluoride as catalyst.

Tsuruta, et al., *Macromol. Chem.*, 111, 236–246 (1968), disclose that diethylzinc prereacted with water polymerizes 3,4-epoxy-1-butene to give a 54% yield of high molecular weight polyether containing only residue (1). Tsuruta, et al., also disclose the isolation of a 3% yield of polyether from 3,4-epoxy-1-butene and uncomplexed diethylzinc as catalyst having evidence of internal double bonds [residue (2)] by infrared spectroscopy. Our investigation of this chemistry resulted in no isolable polymer.

A series of publications [P. Kubisa, *Makromol. Chem.*, Macromol. Symp., 13/14, 203 (1988); K. Brzezinska, R. Szymanski, P. Kubisa, and S. Penczek, *Makromol. Chem., Rapid Commun.*, 7, 1 (1986); M. Bednarek, P. Kubisa, and S. Penczek, *Makromol. Chem.*, Suppl., 15 49 (1989); P. Kubisa and S. Penczek, *Am. Chem. Soc., Div. Polym. Chem., Polym. Preprints*, 31(1), 89–90 (1990); and T. Biedron, R. Szymanski, P. Kubisa, and S. Penzcek, *Makromol. Chem.*, Macromol. Symp., 32, 155 (1990)] teach that the polymer microstructure from copolymerization of propylene oxide and tetrahydrofuran using boron trifluoride etherate and a glycol initiator is determined by interplay of steric and electronic factors, with steric factors prevailing to give copolyethers with about 55 percent secondary hydroxyl groups and 45 percent primary hydroxyl groups. Further, they teach that the major contribution of the electronic effects of the side group is its influence on the basicity of the secondary hydroxyl of the growing chain. Butylene oxide gives a greater amount of secondary hydroxyl than does propylene oxide due to greater steric effects of the ethyl group compared to the methyl group.

None of the prior art discloses our novel polyether compounds described in more detail hereinbelow or a process whereby the novel polyether compounds may be obtained. The polyether compounds provided by the present invention are comprised of m units of residue (1), n units of residue (2), and p units of residue (3) wherein the total value of m+n+p is 5 to 70, the value of n/(m+n+p) is in the range of 0.2 to 0.4, i.e., residue (2) constitutes from 20 to 40 mole percent of the total moles of residues (1), (2) and (3), the value of n/(m+n) is in the range of 0.25 to 0.45, and residues (1), (2) and (3) have the structures:

$$-\text{O}-\text{CH}_2-\underset{\underset{\text{CH}=\text{CH}_2}{|}}{\text{CH}}- \quad , \tag{1}$$

$$-\text{O}-\text{CH}_2-\text{CH}=\text{CH}-\text{CH}_2- \tag{2}$$

and $$-\text{O}-\text{CH}_2-\text{CH}_2-\text{CH}_2-\text{CH}_2- \tag{3}$$

The unsaturated polyethers of this invention are further characterized in that at least 98 percent of the terminal groups have the structure:

$$\text{HO}-\text{CH}_2-\underset{\underset{\text{CH}=\text{CH}_2}{|}}{\text{CH}}- \quad \text{or} \quad \text{HO}-\text{CH}_2-\text{CH}=\text{CH}-\text{CH}_2-$$

Therefore, at least 98 percent of the terminal hydroxyl groups are primary, rather than secondary, hydroxyl groups.

The polyether compounds may be used in the preparation or formulation of surfactants and other compositions analogous to compositions derived from known polyether polymers. The unsaturated polyethers may be hydrogenated to the corresponding saturated polymers which may be employed in the manufacture of polyester-ethers useful, for example, in molding compositions. It is known that hydroxyl-terminated polyethers wherein all, or substantially all, of the terminal hydroxyl groups are primary are more reactive and thus produce superior products when compared to analogous hydroxyl-terminated polyethers wherein a significant portion of the terminal hydroxyl groups are secondary hydroxyl groups. For example, Wolfe, Rubber Chemistry and Technology, 50(4), 688–703, September/October 1977, teaches that titanate-ester-catalyzed melt condensation polymerizations of poly(propylene glycol) having a number-average molecular weight of about 1000 with dimethyl terephthalate and 1,4-butanediol give copolyester-ethers having low inherent viscosities and poor properties compared to copolyester/ethers prepared using poly(tetramethylene glycol) and poly(ethylene glycol) having similar molecular weights. The low inherent viscosities and poor properties are due to the relatively high secondary hydroxyl group content of the poly(propylene glycol). Wolfe also discloses that the use of poly(propylene glycol) end-capped with 10–20 weight percent of ethylene oxide does not overcome the problem, as only a marginal improvement in inherent viscosity was realized. Due to the higher reactivity of the formed primary hydroxyl, end-capping polyethers having secondary terminal hydroxyl groups with ethylene oxide to increase primary hydroxyl content typically is only partially successful. In order to achieve a majority of primary hydroxyl end groups, e.g., greater than 65 percent, large amounts of ethylene oxide are needed and usually give concomittant formation of long ethylene blocks and causes the resulting polyether to have reduced hydrophobicity and thus limits the usefulness of the polyethers in the manufacture of condensation polymers. The high content of primary, terminal hydroxyl groups possessed by the polyether polymers of the present invention renders the polyethers more reactive, and thus more useful, for condensation reactions in general.

Poly(tetramethylene ether) glycol is the industry standard for the preparation of high performance condensation polymers such as Hytrel polymer and polyurethane ethers such as Lycra spandex polymer. Efforts to incorporate a substiuted oxirane such as propylene oxide and butylene oxide for purposes of price and performance give increased concentrations of secondary hydroxyl groups. The polyethers of this invention overcome this difficulty without the incorporation of ethylene oxide or oxetane. The polyethers of this invention are fundamentally different from ethoxylated copolyethers of tetrahydrofuran and butylene oxide, which are expected to have increased hydrophobicity and decreased thermal stability compared to poly(tetramethylene ether) glycol.

The process utilized to prepare the above-described polyether compounds comprises polymerizing 3,4-epoxy-1-butene in the presence of a catalytic amount of a strong protonic acid, tetrahydrofuran, and a nucleophilic initiator compound to obtain the polyether compounds of the invention. The polymerization mechanism involves living polymerization, provided that the acid catalyst is not neutralized or otherwise rendered inactive, to the extent that step-wise addition of 3,4-epoxy-1-butene monomer gives step-wise increase in polymer molecular weight and molecular weight control is readily achieved by the stoichiometry of monomer to initiator. A wide variety of molecular weights may be achieved, but the molecular weights are generally controlled to provide polymers with molecular weights of about 500 to 3000 for use as polymer intermediates.

The polymerization process is carried out in the presence of tetrahydrofuran which functions as both a comonomer and the process solvent. The amount of tetrahydrofuran which may be employed ranges from about 5 to 95 weight percent of the reaction solution. Tetrahydrofuran functions as both solvent and comonomer; however, only minor amounts of tetrahydrofuran are incorporated into the polyether and, even at relatively low loadings, tetrahydrofuran is present in the reaction medium even after completion of the polymerization. Incorporation of tetrahydrofuran gives rise to residues (3), and the value of p/(m+n+p) usually is less than 0.25 and typically is about 0.1. Comparative Example 1 demonstrates that the use of methylene chloride (rather than tetrahydrofuran) as the process solvent gives a low value of n/(m+n) which typically is about 0.20. The inclusion of tetrahydrofuran in the polymerization mixture produces 2 favorable results: (i) the value of n/(m+n) is higher than expected and (ii) the value of n/(m+n) remains approximately constant over a wide range of molecular weights. These results offer significant potential advantages. For example, the decreased content of residues (1) and the resulting increased content of residues (2) and (3) give polyethers which, upon hydrogenation, have a much reduced content of residues having the structure $$-\text{O}-\text{CH}_2-\underset{\underset{\text{CH}_2-\text{CH}_3}{|}}{\text{CH}}-$$

with concomitant increase in the content of residues (3). Such saturated polyether materials possess improved properties such as, for example, improved thermal stability. Furthermore, the ability to prepare substantially the same composition at a variety of molecular weights is desirable to potential users, and the use of tetrahydrofuran is particularly advantageous because the content of residues (1) is more constant over the range of molecular weights of interest. In addition, discoloration of the unsaturated polyether is more easily controlled when the polymerization is conducted in the presence of tetrahydrofuran. The presence of tetrahydrofuran during polymerization results in reduced viscosity which provides better mixing and improved heat transfer. In contrast to reaction carried out in the absence of tetrahyrofuran (see Comparative Example 3), the presence of tetrahydrofuran gives a more constant composition as indicated, for example, by the ratio of n/(m+n) as is shown in Example 5.

Comparative Example 2 demonstrates that when poly(tetramethylene ether) glycol is used as the initiator, the selectivity for formation of residue 2 is not improved and the value of n/(m+n) remains at about the same low value of 0.21. Thus, the presence of tetrahydrofuran and not poly(tetramethylene ether) is responsible for the above described advantages in the polymerization of 3,4-epoxy-1-butene. The polyethers and the process of this invention differ from the copolyethers derived from tetrahydrofuran and oxirane disclosed by Kubisa, et al., in that (i) the polyethers of the invention contain essentially only terminal, primary hydroxyl groups, (ii) the present process results in the incorporation of only minor amounts of tetrahydrofuran into the polyether even though a very large excess of tetrahydrofuran is used, (iii) in the present process tetrahydrofuran exhibits a solvent effect on the stereoselectivity of the polymerization of 3,4-epoxy-1-butene which favors residue (2), and (iv) tetrahydrofuran exhibits a solvent effect of decreasing the rate of conversion of 3,4-epoxy-1-butene to polyether.

The initiator compound may be selected from various nucleophiles such as the hydroxyl compounds disclosed in Published International PCT Application WO 89/02883. The initiator compound preferably is selected from various organic hydroxyl compounds such as alcohols, polyols, i.e., polyhydroxyl compounds containing 2 to 6 hydroxyl groups, and hydroxyl-terminated polymers such as hydroxyl-terminated polyether and polyester polymers. When an alcohol is used as the initiator, the polymeric product obtained has a hydroxyl group on one end of the chain (a terminal hydroxyl group) and thus is a polymeric alcohol. The other end of the polymer chain is terminated with the residue of the alcohol initiator, e.g., a residue having the formula —O—$R^1$ wherein $R^1$ is the residue of an alcohol, preferably an alkyl group, containing up to about 20 carbon atoms. When a polyhydroxyl compound is used as the initiator, the polymer grows from at least 2 of the hydroxyl groups of the initiator, and the subsequently-obtained polymer is a polyhydroxyl polymer. The residue of the polyhydroxy initiators may be represented by the formula —O—$R^2$— wherein $R^2$ is the residue of a polyhydroxy initiator.

Suitable alcohols include low molecular weight organic alcohols and polymeric alcohols which may be linear or branched-chain aliphatic, alicyclic or aromatic. Although secondary or tertiary alcohols may be used, primary alcohols are preferred. Some typically useful alcohol initiators include methyl alcohol, ethyl alcohol, n-butyl alcohol, iso-butyl alcohol, 2-ethylhexyl alcohol, n-decyl alcohol, stearyl alcohol, cetyl alcohol, allyl alcohol, benzyl alcohol, phenol, nonyl-phenol, cresol, and the like. Typically useful glycol initiators include ethylene glycol, 1,2-propanediol, 1,3-propanediol, 1,2-butanediol, 1,4-butanediol, 1,6-hexanediol, 1,4-cyclohexanediol, 1,4-cyclohexanedimethanol, 2,2-dimethyl-1,3-propanediol, 2,2,4-trimethyl-1,3-pentanediol, 2,2,4,4-tetramethyl-1,3-cyclobutanediol, 1,4-dihydroxy-2-butene, 3,4-dihydroxy-1-butene, benzenediols such as hydroquinone and resorcinol, and the like. Typically useful polymeric alcohols and glycols include polyethylene glycol, polyethylene glycol monomethyl ether, polypropylene glycol, polypropylene glycol monobutyl ether, poly(tetramethylene ether) glycol, and the like. Low molecular weight, hydroxyl-terminated polyesters also may function as the .hydroxyl initiator compound. Typically useful polyols include glycerol, starch, sucrose, glucose, pentaerythritol, and the like. Water also may be used as the initiator. Water and diols having 2 to 6 carbon atoms constitute the preferred initiators, i.e., wherein $R^2$ is alkylene of 2 to 6 carbon atoms.

The catalyst employed in the preparation of the novel polyethers described herein must be a strong protonic acid and may be either in liquid form or may be incorporated or contained within a solid resin. The acidic catalyst may be derived from a mixture of a Lewis acid and water, an alcohol or a weak protonic acid. Suitable acid catalysts include tetrafluoroboric acid, perchloric acid, strongly acidic ion exchange resins (e.g., Amberlyst resins) and fluorosulfonic acids such as perfluoroalkanesulfonic acids containing up to about 6 carbon atoms (e.g., trifluoromethanesulfonic acid), fluorosulfonic acid, and perfluorosulfonic acid polymers (e.g., Nafion resins), and the like. An example of a fluorosulfonic acid polymer is Nafion®NR-50 (®E. I. du Pont de Nemours & Co.), available from Aldrich (catalogue No. 30,938-9). The most effective and, therefore, the preferred catalysts are the perfluoroalkanesulfonic acids such as trifluoromethanesulfonic acid and, especially, Nafion NR-50 perfluorosulfonic acidic resin which has been cryogenically ground to 60 to 100 mesh (particles having an average diameter of 170 to 250 microns), available from C. G. Processing of Rockland, Delaware.

The amount of the acidic catalyst which may be used can vary substantially depending, for example, on process conditions and the particular strong acid employed. In batch operation of the process, the amount of catalyst used typically is in the range of 0.5 to 1.5 mole percent based on the equivalents of initiator.

As is specified hereinabove, the polymerization reaction is carried out in the presence of tetrahydrofuran which functions as both a comonomer reactant and as a solvent. If desired, the polymerization reaction may be preformed in the presence of additional co-solvents, e.g., an inert, organic solvent such as a hydrocarbon, chlorinated hydrocarbon, and the like. Specific examples of such solvents include benzene, toluene, xylene, heptane, methylene chloride, chloroform, and the like. The polymerization reaction preferably is carried out in the absence of such a co-solvent.

The process of the present invention may be carried out at temperatures in the range of about 0°–100° C., depending upon the choice of initiator, catalyst and pressure. Temperatures of about 20°–50° C. are preferred. Reaction pressure is not an important aspect of the polymerization reaction and, therefore, the process typically is performed at ambient pressure. However, pressures moderately above or below atmospheric may be used.

In the operation of our novel process, the primary reactant, 3,4-epoxy-1-butene, is added to a mixture of the acidic catalyst, tetrahydrofuran, and nucleophilic initiator compound. The 3,4-epoxy-1-butene may be added all at once or very slowly or in stepwise increments. to a mixture of the catalyst and the initiator. Slow addition of 3,4-epoxy-1-butene is preferred for controlling the heat of reaction and product molecular weight. The polymerizations are generally rather rapid, and reaction is usually complete immediately after complete addition of 3,4-epoxy-1-butene monomer or up to about 16 hours after complete addition, depending upon the rate of 3,4-epoxy-1-butene addition, the amount of tetrahydrofuran used, and catalyst activity.

A preferred embodiment of the polymerization in this invention uses water or 1,4-butanediol as initiator, 60–100 mesh Nafion®NR-50 (®E. I. du Pont de Nemours & Co.) as catalyst, and an amount of tetrahydrofuran that is approximately equal to or slightly greater than the amount of 3,4-epoxy-1-butene added at rate of about 1 to 9 equivalents per hour with rapid stirring and cooling to maintain a reaction temperature below 50° C.

It is apparent from the above process description that the polyether polymers of the present invention can comprise, in addition to the 3,4-epoxy-1-butene residues, a minor or major amount of the residue of a nucleophilic initiator compound. For example, if a polymeric initiator, e.g., a hydroxyl-terminated polyoxyalkylene polymer, is employed and the number of repeat units of 3,4-epoxy-1-butene residues is relatively low, the 3,4-epoxy-1-butene residue content of the polymer may be less than 10 weight percent. On the other hand, if the initiator employed is a low molecular weight compound such as methanol, ethylene glycol, or water, the 3,4-epoxy-1-butene residues may constitute greater than 99 weight percent of the polymer. The polymers typically comprise at least 80 weight percent, preferably at least 90 weight percent, 3,4-epoxy-1-butene and tetrahydrofuran residues. Residues of the initiator compound typically constitute at least 1 weight percent (at least 0.5 weight percent when water is the initiator) of the total weight of the polyether polymers.

Our novel polyether polymers preferably are comprised of m units of residue (1), n units of residue (2), and p units of residue (3) wherein the total value of m+n+p is about 10 to 40, the value of n/(m+n+p) is in the range of 0.3 to 0.4, i.e., residue (2) constitutes from 30 to 40 mole percent of the total moles of residues (1), (2) and (3), the value of n/(m+n) is in the range of 0.35 to 0.45 and p/(m+n+p) is less than 0.15, i.e., residue (3) constitutes less than 15 mole percent of the total moles of residues (1), (2) and (3). The polymers are further characterized in that at least 99% of the terminal groups have the structure:

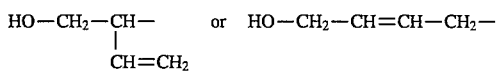

NMR analyses of the polyethers of the present invention have failed to detect any secondary, terminal hydroxyl groups. The primary hydroxyl groups (and thus the polymers) are more reactive for condensation polymerizations reactions in general. The polyether polymers normally have a polydispersity value of less than 4, preferably in the range of 1 to 2. The preferred polyethers contain from about 5 to 20 weight percent, based on the weight of the polyether polymer, of hydroxyl initiator residues, preferably residues having the formula —O—$R^2$— derived from a diol having the formula HO—$R^2$—OH wherein $R^2$ is alkylene of 2 to 6 carbon atoms.

The preparation of the novel polyether polymers of the present invention and the operation of the process are further illustrated by the following examples. Proton NMR spectra are obtained on a 300 MHz NMR spectrometers with samples dissolved in deuterated chloroform containing tetramethylsilane as an internal standard. The value of n/(m+n+p) is determined by comparison of the integrated proton NMR absorptions of residues (1), (2) and (3). Number average molecular weights (Mn) and polydispersity values (Mw/Mn) are determined using size-exclusion chromatography with refractive index detection in tetrahydrofuran using four 10 mm PLgel mixed-bed columns and calibrated using narrow molecular weight distribution polystyrene standards. Hydroxyl numbers are determined from titration of the acetic acid formed by the reaction of the sample with acetic anhydride.

EXAMPLE 1

To a 50-mL reaction flask equipped with nitrogen atmosphere, magnetic stirbar, and thermocouple are charged 0.10 g (0.091 meq) of Nafion NR-50 resin, (H+ form, 1100 EW, 60–100 mesh), 0.18 g (0.010 moles) water, and 0.94 g (0.013 moles) of tetrahydrofuran. 3,4-Epoxy-1-butene (distilled, 13.6 g, 0.194 moles) is added dropwise with stirring and cooling with an ice-water bath over a period of about 1.5 hours. The reaction mixture is filtered to remove the catalyst and the filtrate concentrated using reduced pressure at 40° C., to give 13 g of a clear, colorless oil having a value of n/(m+n) of about 0.25, a value of m+n+p of about 18, a value of n/(m+n+p) of about 0.24, and a value of p/(m+n+p) of about 0.06.

EXAMPLE 2

To a 50-mL reaction flask equipped with nitrogen atmosphere, magnetic stirbar, and thermocouple are charged 0.10 g (0.091 meq) of Nafion 1100 EW resin (H+ form, 60–100 mesh), 0.18 g (0.010 moles) water, and 8.71 g (0.121 moles) of tetrahydrofuran. 3,4-Epoxy-1-butene (distilled, 7.79 g, 0.111 moles) is added dropwise with stirring over a period of about 1.5 hours, giving a reaction temperatures of 35°–40° C. The reaction mixture is filtered to remove the catalyst. The filtrate is concentrated using reduced pressure at 40° C., to give 8.06 g of a clear, colorless oil having a value of n/(m+n) of about 0.42, a value of m+n+p of about 16, a value of n/(m+n+p) of about 0.33, a value of p/(m+n+p) of about 0.24, and Mn=1100 and Mw/Mn=2.51.

EXAMPLE 3

To a 50-mL reaction flask equipped with nitrogen atmosphere, magnetic stirbar, and thermocouple are charged 0.10 g (0.091 meq) of Nafion 1100 EW (H+ form, 60–100 mesh), 0.18 g (0.010 moles) of water, and 10.0 g (0.139 moles) of tetrahydrofuran. The reaction flask is cooled with an ice-water bath and 14.0 g (0.200 moles) of 3,4-epoxy-1-butene (distilled) is added dropwise, with stirring, over a period of about 1.5 hours, giving reaction temperatures of 5°–10° C. The reaction mixture is filtered to remove the catalyst and the filtrate is concentrated under reduced pressure at 40° C., to give 14.6 g of a clear, colorless oil having a value of n/(m+n) of about 0.42, a value of m+n+p of about 19, a value of n/(m+n+p) of about 0.37, and a value of p/(m+n+p) of about 0.11.

EXAMPLE 4

To a 250-mL flask equipped with a nitrogen inlet, a reflux condenser, and a magnetic stirbar was charged 100 mL of tetrahydrofuran, 6.2 g (0.10 mole) ethylene glycol, and 28 g (0.40 mole) 3,4-epoxy-1-butene. The flask was cooled with an ice-water bath and the solution was stirred. Then 2 drops of trifluoromethanesulfonic acid was added, and the solution was stirred and allowed to warm to room temperature over 24 hours. About 5 drops of triethyl amine was added to neutralize the catalyst, and the solution was evaporated under reduced pressure and held under vacuum overnight, giving 38.0 g of a light-yellow syrup having a value of n/(m+n) of about 0.42, a value of n/(m+n+p) of about 0.38, and a value of p/(m+n+p) of about 0.10.

COMPARATIVE EXAMPLE 1

To a 50-mL reaction flask equipped with nitrogen atmosphere, magnetic stirbar, and thermocouple are charged 0.10 g (0.091 meq) of Nafion 1100 EW resin (H+ form, 60–100 mesh), and 0.18 g (0.010 moles) of water. 3,4-Epoxy-1-butene (distilled, 13.6 g, 0.194 moles) is added dropwise to the catalyst/water mixture over a period of about 1.5 hours while stirring and cooling with an ice bath. Methylene chloride (10 mL) is added and the mixture is filtered to remove the catalyst. The filtrate is concentrated using reduced pressure at 40° C., to give 10 g of a clear, colorless oil having a value of m+n of about 16 and a value of n/(m+n) of about 0.20.

COMPARATIVE EXAMPLE 2

To a 50-mL reaction flask equipped with nitrogen atmosphere, magnetic stirbar, and thermocouple are charged 0.10 g (0.091 meq) of Nafion 1100 EW resin (H+ form, 60–100 mesh), and 0.18 g (0.010 moles) of poly(tetramethylene ether) glycol having a number average molecular weight of 250. 3,4-Epoxy-1-butene (distilled, 13.6 g, 0.194 moles) is added dropwise over a period of about 1.5 hours while stirring and cooling with an ice-water bath. Methylene chloride (10 mL) is added and the mixture is filtered to remove the catalyst. The filtrate is concentrated using reduced pressure at 40° C., to give 5.8 g of a clear, colorless oil having a value of m+n of about 18, a value of n/(m+n) of about 0.21, a value of m+n+p of about 31, a value of n/(m+n+p) of about 0.12, and a value of p/(m+n+p) of about 0.43, where p repeat units of residue (3) are derived from the poly(tetramethylene ether) glycol initiator.

EXAMPLE 5

A 1-liter reactor equipped with a stainless steel stirring rod with helical paddle, a stainless steel cooling coil, and a thermocouple is flushed with argon and then charged with, in order, water (6.48 g, 0.36 moles), Nafion 1100 EW resin (9.0 g, 9.09 meq, H+ form, 60–100 mesh) and tetrahydrofuran (30 mL). The reactor is cooled with ice and with chilled water (5°–10° C.) circulating through the cooling coil. 3,4-Epoxy-1-butene (distilled, 490 g, 6.99 moles) is added by syringe at a rate of about 100 g per hour giving a reaction temperature of about 11°–18° C. During the addition of the 3,4-epoxy-1-butene, samples of the reaction mixture are taken periodically and analyzed by proton NMR for determination of n/(m+n), n/(m+n+p), p/(m+n+p), and m+n+p. Samples are taken after a total of 140 (Sample 1), 210 (Sample 2), 280 (Sample 3), 350 (Sample 4), 420 (Sample 5) and 490 (Sample 6) g of 3,4-epoxy-1-butene are added to the reaction mixture. The values of n/(m+n), n/(m+n+p), p/(m+n+p) and m+n+p are set forth in Table I.

TABLE I

| Sample | n/(m + n) | n/(m + n + p) | p/(m + n + p) | m + n + p |
|---|---|---|---|---|
| 1 | 0.27 | 0.24 | 0.10 | 6 |
| 2 | 0.28 | 0.26 | 0.08 | 9 |
| 3 | 0.26 | 0.24 | 0.08 | 11 |
| 4 | 0.27 | 0.25 | 0.07 | 14 |
| 5 | 0.24 | 0.23 | 0.07 | 17 |
| 6 | 0.28 | 0.27 | 0.06 | 19 |

COMPARATIVE EXAMPLE 3

The procedure of Example 5 is repeated substantially as described except that no tetrahydro-furan is employed. Values for n/(m+n) and m+n are determined from samples taken as described in Example 5. These value are shown in Table II.

TABLE II

| Sample | n/(m + n) | m + n |
|---|---|---|
| 1 | 0.12 | 5 |
| 2 | 0.13 | 7 |
| 3 | 0.13 | 9 |
| 4 | 0.15 | 12 |
| 5 | 0.16 | 15 |
| 6 | 0.17 | 17 |

EXAMPLE 6

The procedure of Example 5 is repeated except that 400 mL of tetrahydrofuran are used and samples are taken after the addition of a total of 140, 280, 350, and 490 g of 3,4-epoxy-1-butene. The values of n/(m+n), n/(m+n+p), p/(m+n+p), and m+n+p are set forth in Table III.

TABLE III

| Sample | n/(m + n) | n/(m + n + p) | p/(m + n + p) | m + n + p |
|---|---|---|---|---|
| 1 | 0.38 | 0.35 | 0.08 | 3 |
| 2 | 0.36 | 0.31 | 0.08 | 6 |
| 3 | 0.41 | 0.38 | 0.11 | 8 |
| 4 | 0.42 | 0.38 | 0.11 | 10 |

As has been mentioned above, the unsaturated polyether polymers provided by the present invention may be hydrogenated to the corresponding saturated polymers comprising repeating units of residues having the structure:

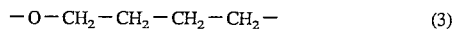

(3)

and

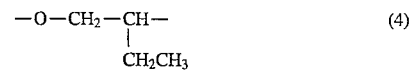

(4)

The saturated polyethers may be employed in the manufacture of polyester-ethers useful, for example, in molding compositions. The following examples illustrate typical hydrogenation procedures which may be used.

EXAMPLE 7

The unsaturated polyether glycol prepared in Example 1 (10.0 g), Raney-nickel (1.0 g, prewashed with methanol), and methanol (100 mL) are charged to a 1-L autoclave equipped with a magnetic stirbar. The auto-clave is purged with nitrogen, pressurized with 500 psig hydrogen, then heated to 80° C., with stirring. The reaction mixture is stirred at 80° C. and 500 psig for 20 hours. After cooling, the pressure is released, and the reaction mixture is removed, filtered, and concentrated by evaporating the methanol to give 4.0 g of a clear, colorless oil comprising m repeat units of residue (4) and p repeat units of residue (3), wherein the value of m+p is about 18 and the value of p/(m+p) is about 0.30.

EXAMPLE 8

The unsaturated polyether glycol prepared in Example 2 (5.0 g), Raney-nickel (0.5 g, prewashed with methanol), and methanol (100 mL) are charged to a 1-L autoclave equipped with a magnetic stirbar. The autoclave is purged with nitrogen, pressurized with 500 psig hydrogen, then heated to 80° C., with stirring. The reaction mixture is stirred at 80° C. and 500 psig for 20 hours. After cooling, the pressure is released, and the reaction mixture is removed, filtered, and concentrated by evaporating the methanol to give 4.0 g of a clear, colorless oil comprising m repeat units of residue (4) and p repeat units of residue (3), wherein the value of m+p is about 16 and the value of p/(m+p) is about 0.59.

EXAMPLE 9

The unsaturated polyether glycol prepared in Example 3 (10 g), Raney-nickel (1.0 g, prewashed with methanol), and methanol (100 mL) are charged to a 1-L autoclave equipped with a magnetic stirbar. The autoclave is purged with nitrogen, pressurized with 500 psig hydrogen then heated to 80° C. with stirring The reaction mixture is stirred at 80° C. and 500 psig for 20 hours. After cooling, the pressure is released, and the reaction mixture is removed, filtered, and concentrated by evaporating the methanol to give 9.0 g of a clear, colorless oil comprising m repeat units of residue (4) and p repeat units of residue (3), wherein the value of m+p is about 19 and the value of p/(m+p) is about 0.48.

The invention has been described in detail with particular reference to preferred embodiments thereof, but it will be understood that variations and modifications will be effected within the spirit and scope of the invention.

We claim:

1. A polyether polymer comprising m units of residue (1), n units of residue (2), and p units of residue (3) wherein (i) residues (1), (2) and (3) have the structures:

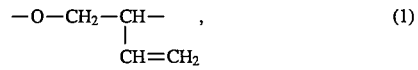 (1)

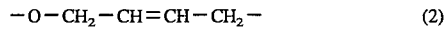 (2)

and

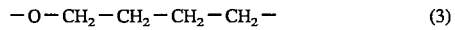 (3)

(ii) the total value of m+n+p is 5 to 70, (iii) the value of n/(m+n+p) is in the range of 0.2 to 0.4, and (iv) at least 98 percent of the terminal groups have the structure:

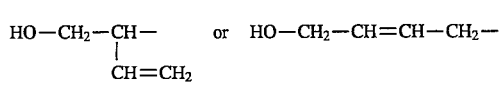

2. A polymer according to claim 1 wherein the value of n/(m+n) is in the range of 0.25 to 0.45 and the polymer has a polydispersity value of less than 4.

3. A polyether polymer comprising m units of residue (1), n units of residue (2), and p units of residue (3) wherein (i) residues (1), (2) and (3) have the structures:

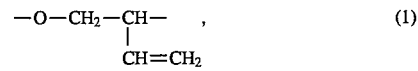 (1)

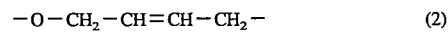 (2)

and

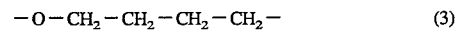 (3)

(ii) the total value of m+n+p is 10 to 40, (iii) the value of n/(m+n+p) is in the range of 0.3 to 0.4, (iv) the value of n/(m+n) is in the range of 0.35 to 0.45, p/(m+n+p) is less than 0.15, and (v) at least 98 percent of the terminal groups have the structure:

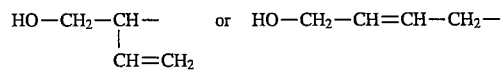

4. A polymer according to claim 3 wherein the polymer has a polydispersity value of 1 to 2 and is comprised of at least 80 weight percent of residues derived from 3,4-epoxy-1-butene and tetrahydrofuran.

5. A polymer according to claim 3 wherein the polymer has a polydispersity value of 1 to 2 and is comprised of about 5 to 20 weight percent, based on the weight of the polyether polymer, of hydroxyl initiator residues.

* * * * *

UNITED STATES PATENT AND TRADEMARK OFFICE
CERTIFICATE OF CORRECTION

PATENT NO. : 5,502,137
DATED : March 26, 1996
INVENTOR(S) : James C. Matayabas, Jr., et al.

It is certified that error appears in the above-indentified patent and that said Letters Patent is hereby corrected as shown below:

Column 12, line 5 (Claim 1), after the structures, --- and (v) p/(m+n+p) is less than 0.15 --- should be added.

Signed and Sealed this

Second Day of July, 1996

Attest:

BRUCE LEHMAN

Attesting Officer     Commissioner of Patents and Trademarks